June 12, 1928.

J. SLEPIAN 1,673,598

ALTERNATING CURRENT SHUNT COMMUTATOR GENERATOR

Filed Dec. 14, 1920

WITNESSES:

INVENTOR
Joseph Slepian
BY
ATTORNEY

Patented June 12, 1928.

1,673,598

UNITED STATES PATENT OFFICE.

JOSEPH SLEPIAN, OF SWISSVALE, PENNSYLVANIA, ASSIGNOR TO WESTINGHOUSE ELECTRIC & MANUFACTURING COMPANY, A CORPORATION OF PENNSYLVANIA.

ALTERNATING-CURRENT SHUNT-COMMUTATOR GENERATOR.

Application filed December 14, 1920. Serial No. 430,615.

My invention relates to self-excited alternating-current generators and has particular relation to commutator-type machines having shunt-connected field windings.

I have discovered that an ordinary shunt-connected direct-current machine, when provided with a laminated field member and a neutralizing winding, may be used to generate alternating currents if a condenser is placed in series with the shunt field winding. If the machine is driven at constant speed, the voltage may be controlled by means of a variable resistance in the field circuit, and the frequency may be determined by the natural frequency of the field circuit.

Figure 1:
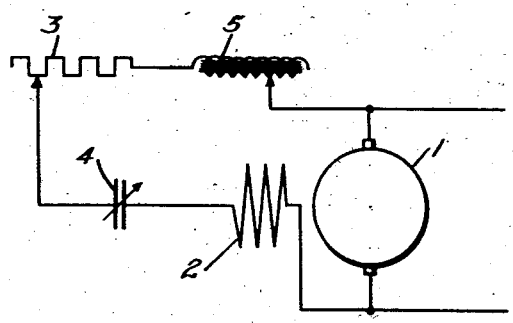
Figure 2:
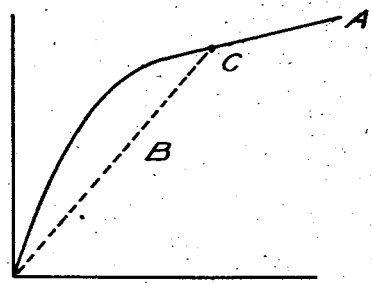

In the drawings, Figure 1 is a diagrammatic view of apparatus and circuits embodying my invention, and Fig. 2 is a characteristic curve which will be referred to hereinafter.

My machine has an armature 1 which is provided with a commutator and is driven from any suitable source (not shown). A shunt-connected field winding 2 is connected across the terminals of the armature, said field winding having in series therewith a regulating resistance 3 and a variable capacitance 4. The field circuit may also include a variable inductance 5. The machine may be provided with a neutralizing or compensating winding 6, as is usual in alternating-current commutator machines.

The uses of such a generator are numerous. Since the frequency is readily controlled by varying the capacitance or inductance of the field circuit, the generator may be employed to supply power to induction motors, the speed of which may be varied by the frequency of the generator currents. Such a system is ideal for automobile drives.

Another application of my generator is to feed the wound secondary member of an induction motor the primary member of which is connected across a constant-frequency system. The motor will then run at a speed corresponding to the difference or sum of the two frequencies supplied, according to the direction of phase rotation of the currents supplied to the secondary member.

Other uses of my invention will readily occur to those skilled in the art.

The voltage of a generator of the character described may be determined by reference to Fig. 2. First a "saturation" curve A is plotted for the machine. To do this, the machine is driven at a constant speed, and alternating current of varying strength is supplied to the field winding. The abscissæ of the curve are the field currents, and the ordinates are the energy components of the armature electromotive forces, that is, the components in phase with the field current.

Finally, a straight line B is drawn, passing through the origin and having a slope equal to the ohmic resistance of the field and armature circuit. The point C at which said line cuts the "saturation" curve is the point at which the generator will run. The slope of the line B may readily be varied by means of the resistance 3.

While I have shown my invention in a preferred form, it is to be understood that it is susceptible of various modifications by those skilled in the art without departing from the spirit and scope thereof, as set forth in the appended claims.

I claim as my invention:—

1. An alternating-current generator comprising an armature core of magnetic material having windings and a commutator, brushes bearing on said commutator, an exciting means including a core of magnetic material, a field winding thereon and a serially connected condenser energized in shunt across the brushes, and a load circuit receiving energy from the brushes, the resistance of the shunt field circuit being such that the voltage-current curve for said shunt field circuit intersects the curve expressing the relation between the generated voltage and the field exciting current of the machine.

2. An alternating-current generator comprising an armature core of magnetic material having windings and a commutator, brushes bearing on said commutator, an exciting means including a core of magnetic material, a field winding thereon, a field rheostat and a serially connected condenser energized in shunt across the brushes, means for varying the relation between inductance and condensance in said shunt field circuit, and a load circuit connected across the brushes.

3. An alternating-current generator comprising an armature core of magnetic material having windings and a commutator, brushes bearing on said commutator, an exciting means including a core of magnetic material, a field winding thereon, a field rheostat and a serially connected condenser energized in shunt across the brushes, means for changing the natural period of said shunt exciting field circuit, and a load circuit connected to the brushes and consisting solely of translating devices of which the frequency is determined by said generator.

In testimony whereof, I have hereunto subscribed my name this 3rd day of December, 1920.

JOSEPH SLEPIAN.